Feb. 3, 1970    A. B. BROERMAN ET AL    3,492,873
PNEUMATIC AMPLIFIER SAMPLING VALVE FOR CHROMATOGRAPHIC ANALYZERS
Filed Dec. 29, 1967    5 Sheets-Sheet 1

INVENTOR.
A. B. BROERMAN
L. B. ROOF
BY
*Young & Quigg*
ATTORNEYS

FIG. 4

INVENTOR.
A. B. BROERMAN
L. B. ROOF
BY
Young & Quigg
ATTORNEYS

United States Patent Office 3,492,873
Patented Feb. 3, 1970

3,492,873
PNEUMATIC AMPLIFIER SAMPLING VALVE FOR CHROMATOGRAPHIC ANALYZERS
Arthur B. Broerman and Lewis B. Roof, Bartlesville, Okla., assignors to Phillips Petroleum Company, a corporation of Delaware
Filed Dec. 29, 1967, Ser. No. 694,630
Int. Cl. G01n 1/00
U.S. Cl. 73—422      1 Claim

ABSTRACT OF THE DISCLOSURE

A multi-port, diaphragm-sealed, fluid-activated valve mechanism in which positive pressures of control fluids are used to sequentially actuate two pistons in piston chambers which control movement of plungers which, in turn, seal respective valve ports sequentially into positions. The control fluid pressure system allows the control fluid pressure within a pressure chamber to remain substantially up to actuation pressure for the piston therewithin during the time interval after positive pressure is shut off from that chamber and is being built up in the other chamber so as to prevent leakage of high-pressure fluid from the ports.

---

This invention relates to a multi-port, diaphragm-sealed valve mechanism. In another aspect, it relates to a fluid-actuated, multi piston-operated, sampling valve for a chromatographic analyzer having a means for reducing pressure on the diaphragm so that the carrier gas can overcome the inherent stiffness of the sealing diaphragm in combination with a means for supplying and controlling a pressure signal to the pistons so that the valve can be used to sample a high pressure fluid stream.

Gas chromatography is a known method of analyzing fluid samples by preferential sorption and desorption. The desirability of using chromatography for such specific uses as fractionation (multi-stage distillation) control has been recognized for some time. Certain features of process chromatography, such as specific measurement, high sensitivity, and simplicity of operation make this type of analyzer very attractive for use in automatic process control. There are, however, some apparently inherent features of chromatography which have appeared to be obstacles in adapting chromatography to wide-spread use in process control.

One problem occurs when an attempt is made to use a sampling valve in a high pressure gas or liquid stream. The carrier gas is at moderate pressures, for example 30 p.s.i. whereas high pressure gas streams are in excess of 500 p.s.i., up to 1000 p.s.i. or higher. In liquid-liquid chromatography, the liquid streams utilized are many times in excess of 5000 p.s.i.

In U.S. 3,140,615, Arthur B. Broerman, there is disclosed and claimed a suitable fluid-actuated, multi piston-operated, sampling valve which can be used for chromatographic analysis. This valve is operable up to about 300 p.s.i. very satisfactorily. However, at higher pressures, the sample gas pressure overcomes the force of the springs in the bottom part of the valve and unseats the plungers during the operation, causing leakage from one cavity to the next within the valve.

It has been proposed to overcome the force of the sample gas on the plungers by supplying fluid pressure to the pistons in addition to that supplied by the bottom springs. Due to the construction of the device, the fluid pressure also flows to the upper spring chamber and to the diaphragm seal. This pressure causes sealing in the areas in which the pistons are not in sealing engagement with the diaphragm due to the fact that the carrier gas is at 30 p.s.i. and at that pressure it is not sufficient to overcome the force of the pressure on the underside of the diaphragm. Thus, applying pressure to the spring piston chambers causes improper flow of carrier gas to the sampling valve.

It has been found that the valve disclosed and claimed in U.S. 3,140,615 operates best if the spring chamber is evacuated so that a vacuum is drawn against the underside of the diaphragm. Using this vacuum draw on the underside of the diaphragm, carrier gas can easily overcome the inherent stiffness of the diaphragm and flow through the valve ports when open as desired.

Recently, I have discovered that a valve similar to that disclosed and claimed in U.S. 3,140,615 can be used to sample high pressure gas streams without loss of carrier gas flow characteristics by blocking off the passage between the upper spring piston chamber and the lower spring piston chamber and using a signal pressure in the lower spring piston chamber as well as in the central piston chamber to drive the pistons.

However, at even higher pressures (e.g., above about 1500 p.s.i.), I have found that leakage occurs from the ports of this improved valve mechanism when switching from one valve position to the other valve position. I have now discovered a means for preventing such leakage.

By various aspects of this invention, one or more of the following, or other, objects can be obtained.

It is an object of this invention to provide a chromatographic analyzer sampling valve which can be used to sample fluid at high pressure using a carrier fluid at relatively low pressure.

It is a further object of this invention to provide a chromatographic analyzer sampling valve which can be used to sample fluid at relatively low pressure using a carrier fluid at high pressure.

It is another object of this invention to provide a fluid-actuated, pneumatically-amplified, diaphragm-sealing, sampling valve for supplying sample slugs of a liquid stream to the columns of a chromatographic analyzer with a liquid carrier.

It is a still further object of this invention to provide a fluid-actuated, pneumatically-amplified, diaphragm-sealing valve for a chromatographic analyzer wherein adequate plunger pressure maintains pistons in sealing contact without loss and leaking when both high and low pressure fluid streams are controlled thereby.

Other aspects, objects, and several advantages of this invention are apparent to one skilled in the art from a study of this disclosure.

According to the invention, there is provided a two-position, fluid-actuated, diaphragm-sealed, sampling valve in which a positive pressure is used to sequentially actuate two pistons within two chambers which control movement of plungers which seal the ports for high-pressure sampling or high-pressure carrier fluids, said valve having a control fluid pressure system which allows the control fluid pressure within a previously actuated pressure chamber to remain substantially up to actuation pressure during the time interval after control pressure is shut off from that chamber and is being built up in the other chamber. This pressure system will thereby maintain the control pressure within the previously actuated cylinder high enough to keep the respective ports controlled by that chamber sealed until control pressure in the other piston chamber is built up to full actuation pressure. This improved mechanism is particularly useful in utilizing a high-pressure carrier or sample fluid with a low-pressure sample or carrier fluid. Preferably, a vacuum is maintained beneath the diaphragm to open the low-pressure fluid ports at predetermined time intervals.

The invention will now be described with reference to the accompanying drawings in which:

FIGURE 3 and 3a are exploded perspective views of the components of the diaphragm valve shown in FIGURE 2 arranged in the order of their assembly;

FIGURE 4 is a full sectional view of the assembled valve shown in FIGURES 2 and 3;

Figure 1:
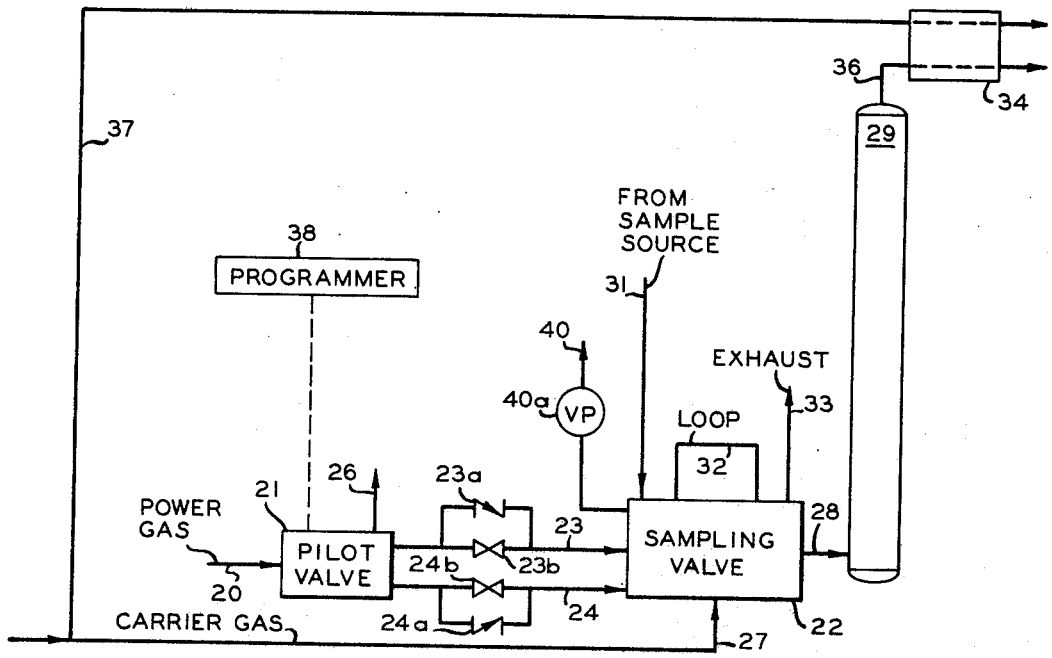
FIGURE 1 is a schematic flow diaphragm of a chromatographic analyzer system showing an embodiment of the invention.

Reference is now made to the drawing in detail, wherein like parts have been designated by like reference numerals, and to FIGURE 1 in particular, wherein a power gas, such as air, passes via conduit 20 to pilot valve 21, wherein the power gas stream is directed to a first chamber (not shown) of a pneumatically-actuated, diaphrgam-sealed, sampling valve 22 via conduit 23 and one way valve 23a during a first time interval. Also, a second chamber (not shown) is vented through line 24, restrictor 24b, valve 21 and line 26. Restrictor 24b substantially prevents the second chamber from venting until full signal pressure has built up in the said first chamber. Vacuum pump 40a pulls a vacuum on line 40 which draws a vacuum on a third chamber (not shown) which chamber is in communication with the underside of the sealing diaphragm to pull a continuous vacuum thereon as will be hereinafter described. During a second interval of time, power gas passes through line 20, pilot valve 21, and conduit 24 and one way valve 24a to supply pressure to the second chamber. During this second interval of time, the first chamber of sampling valve 22 is vented via conduit 23, restrictor 23b, pilot valve 21 and pilot exhaust conduit 26. Restrictor 23b substantially prevents the first chamber from venting until full signal pressure has build up in the said second chamber. Valve 21 can be any suitable four-way valve or can be a combination of two or more three-way valves. For example, valve 21 can be the valve described in U.S. 3,176,516. A carrier fluid is passed via conduit 27, sampling valve 22, and conduit 28 to column 29. A simple source (not shown) such as from process stream, is connected to sampling valve 22 via conduit 31, being circulated through sample loop 32 of sampling valve 22, and vented therefrom via sample exhaust conduit 33. Periodically, the sample in loop 32 is passed along with the carrier fluid via conduit 28, to sorption column 29, where constituents of the sample are absorbed or adsorbed, depending upon the nature of the contact material, and then are selectively desorbed by a continuing flow of carrier fluid therethrough to be identified and measured.

The effluent from the sorption column 29 passes through an analyzer, indicated as thermal conductivity assembly 34, via conduit 36. The output signal from the detector 34 is passed to a recording instrument (not shown), which can be a conventional strip chart recorder. A stream of carrier fluid is passed via conduit 37 from conduit 27 directly to the reference cell of detector 34, so as to balance out the effect of the carrier fluid in the column 29 effluent. The sample fluid to be analyzed generally enters the system continuously through conduit 31. It is exhausted through conduit 33, even when a slug thereof is selected for analysis. Pilot valve 21 is actuated by programmer 38, which can be operated by a time cycle or other means.

When pilot valve 21 is changed from the first described position, power gas is now exhausted from sampling valve 22 via conduit 23 after full signal pressure has built up in the second chamber. Carrier fluid now passes to sample loop 32, collecting the sample trapped therein, and carrying the same to sorption column 29, via conduit 28. Thus, each time power gas is supplied to conduit 24 and gas is exhausted from conduit 23 through valve 21 and line 26, a measured sample is passed via conduit 28 to column 29 for sorption and desorption therein. The carrier fluid carries the measured sample, as determined by the loop size, into the column.

Figure 2:
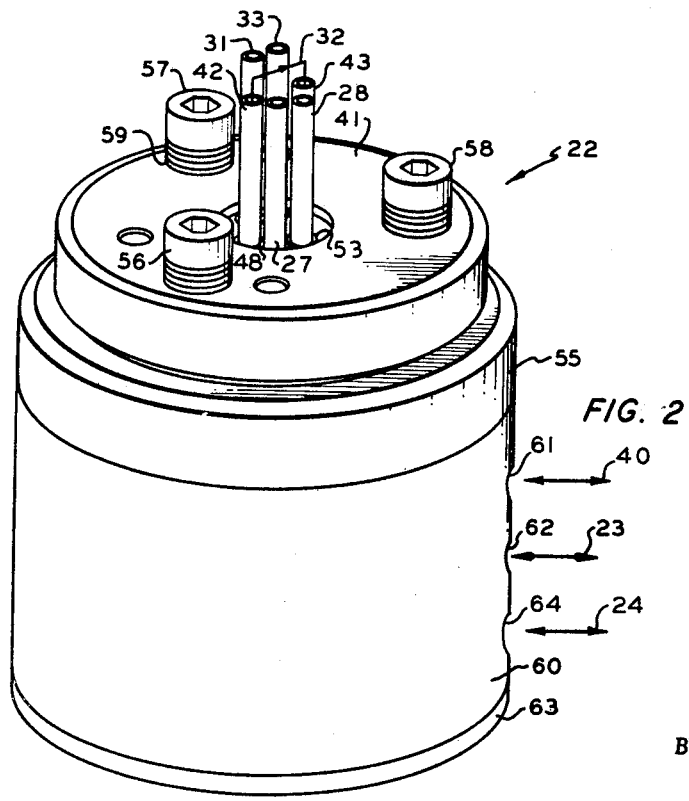
FIGURE 2 is a perspective view of an assembled fluid-actuated, diaphragm-sealed valve schematically in FIGURE 1.

In FIGURE 2, there is shown a perspective view of the assembled fluid-actuated flexible diaphragm sampling valve of this invention, generally designated 22. Sampling valve 22 comprises an upper cap 41 provided with six small diameter conduits 27, 28, 31, 33, 42 and 43, which communicate directly with the lower surface of upper block 41 by spaced vertical passages, such as 48. Sample loop 32 communicates between conduits 42 and 43. Conduit 42, for example, is press fitted into spaced passage 48, thereby effecting a seal. Silver brazing gives mechanical strength to the press fit to prevent twisting the conduit and breaking the seal. Adjacent to upper block is intermediate block 55 provided with a plurality of cylindrical passages (not seen) communicating between the upper and lower faces thereof. Allen headed cap screws 56 to 58 secure cap 41 to intermediate block 55, which is spaced therefrom by a flexible sealing diaphragm and cushion (not seen). Plural Belleville washers, such as 59, are positioned on the shaft of the cap screws. Washers 59 permit tightening down cap 41 evenly. This is due to the feel of slowly increasing torque as turning of cap screws 56 to 58 exerts downward pressure on cap 41, gradually compressing the washers flat. There is an abrupt change in the torque as the washers flatten, indicating that further cap-screw tightening would damage diaphragm and/or cap. If desirable, the Belleville washers can be entirely eliminated. Preferably, however, there are some Belleville washers present.

Disposed adjacent and supporting body 55 is a cylindrical casing or sleeve 60, provided with threaded passages 61, 62 and 64. Passage 61 communicates with an internal upper spring chamber (not shown) defined by body 55 and an internally disposed first power piston (not seen). Passage 62 communicates with another internal annular chamber (not shown) disposed within casing 60. Passage 64 communicates with a lower spring chamber defined by a second power piston, casing 60 and third body 63, which serves as a closure pulley and forms the base of valve 22.

Figure 3:
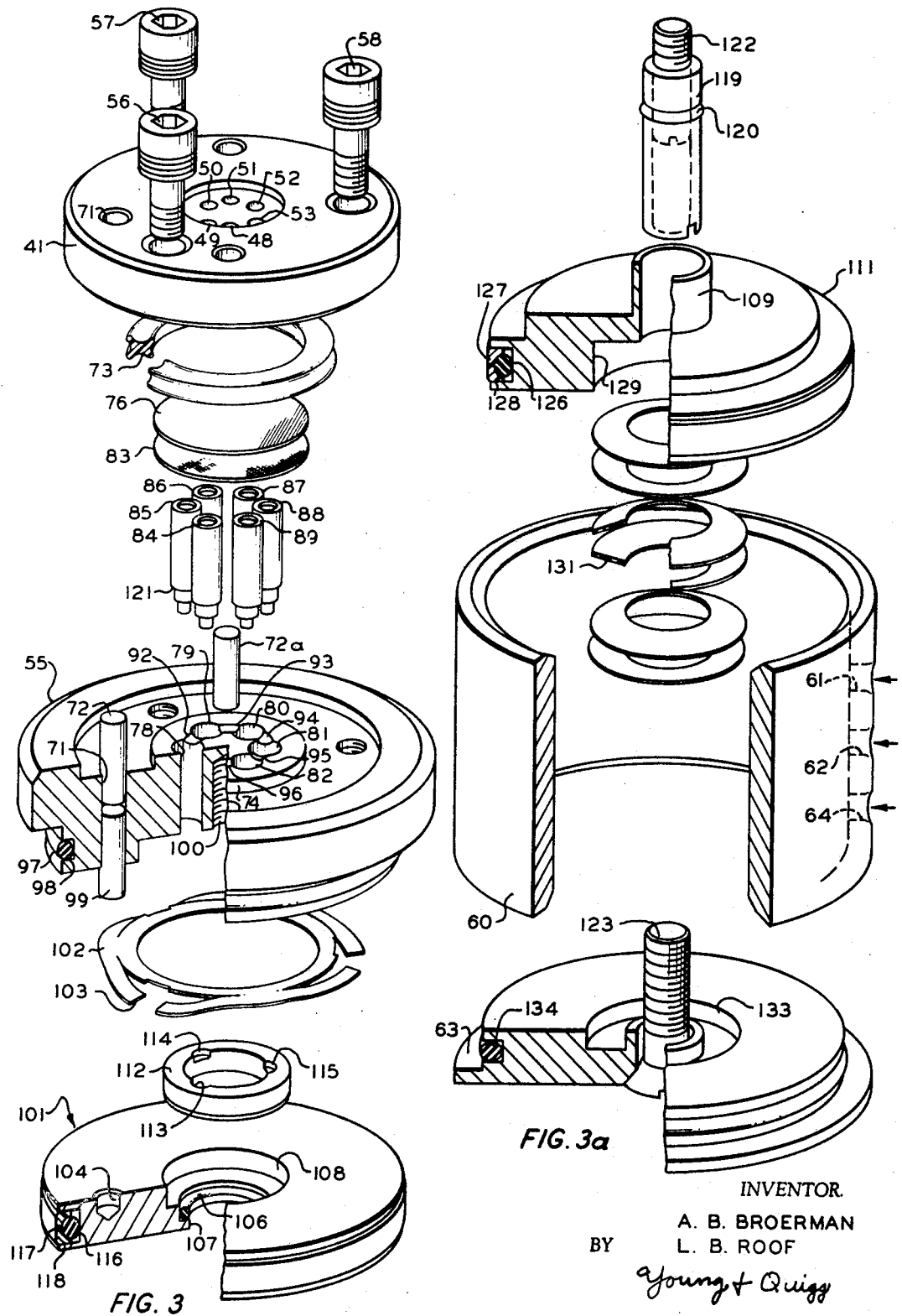

Referring now to FIGURES 3 and 3a, showing an exploded view of the sampling valve, cap 41 is provided with one or more vertical passages, such as 71 and 71a, which accommodate cap key pins, such as 72, that align cap 41 properly relative to body 55. A resilient quad-ring 73, of generally square cross-section, with concave sides, is disposed between cap 41 and body 55. Ring 73 is preferably composed of an elastomeric material which is chemically inert and heat resistant, such as silicone rubber, and seats on shoulder 74 of body 55 beneath cap 41.

A flexible sealing diaphragm 76, of a diameter about that of the inner diameter of raised portion 74, and at least sufficient to cover vertical passages 77 to 82, is disposed above body 55. Sealing diaphragm 76 is preferably composed of a thermosetting plastic which is chemically inert and heat resistant, such as Teflon (a polymer of tetrafluoroethylene).

Disposed between diaphram 76 and body 55 is a cushion 83, which is suitably a 2 mil thick cloth of Dacron (a polyester fiber). It serves to prevent the Teflon sealing diaphragm from cold flowing, and also furnishes support for it to prevent ballooning under alternating carrier and power gas pressure, which results in an extended cycling life of the valve. Cushion 83 also serves to distribute pressure on the flexible diaphragm against the lower face of cap 41, thus evening out any variations in thickness of the diaphragm.

A set of metal plunger rods 84 to 89, are located within vertical passages 77 to 82, respectively, when the valve is assembled. These rods are machined to have a central relief in their upper end which provides an annular-shaped contact surface, that allows more sealing pressure per unit area to be exerted against the adjacent areas of cushion 83, as directed. Rods 85, 87 and 89 are 0.010 inch shorter than rods 84, 86 and 88.

Recesses 91 to 96, about 0.010–0.014 inch in depth, are provided within the circle described in passages 77 to 82, each recess communicating with the adjacent vertical passages. This type of communication between the vertical passages minimizes hang-up of sample fluid or carrier gas, and obviates excess pressure drop.

In order to show the exact construction of parts 71, 72, 78, 97, 98, 99 and 100, part 55 in FIGURE 3 has been quarter sawed and the quarter containing parts 77 and 91 has been removed. However, obviously cylinder 77 occupies one point of the hexagon formed by cylinders 77, 78, 79, 80, 81 and 82, and contains piston 84 when assembled, and cylinder 77 is connected to cylinder 78 by recess 91 and to cylinder 82 by recess 96, similar to the way all the cylinders 77 to 82 and all the recesses 91 to 96 are connected in series.

A resilient O-ring 97, of generally circular cross-section, is disposed in a peripheral slot 98 in the lower portion of body 55. This ring makes an air-tight seal between body 55 and supporting casing 60. Extending from the lower end of passage 71 is another key pin 99, that aligns body 55 properly relative to air-loaded first power piston 101. A threaded vertical recess 100 is disposed central of body 55 from the lower face.

A crimped, metal retracting spring 102 machined from a spring steel stock is disposed between the lower surface of body 55 and the upper surface of piston 101. The cut-outs, such as 103, are aligned to permit the passage of key pins, such as 99, therethrough to anchor in recess 104 of piston 101.

A resilient O-ring seal 106, of generally circular cross-section, is disposed on a shoulder 107 within a passage 108 central of piston 101. As assembled, ring 106, makes sealing contact with collar 109 of spring-loaded, second power piston 111. An annular-shaped member 112, serves as a retainer for ring 106, and as a push disc for short plunger rods 85, 87 and 89. Disc 112 is provided with three notched recesses, 113 to 115, which are adjacent to the lower ends of long plunger rods 84, 86 and 88. These recesses serve as reliefs preventing contact between the rods and disc 112. The lower edge of disc 112 is beveled to aid seating body 101. Another O-ring 116 and a cap seal 117 comprising a thermosetting plastic, such as Teflon, are disposed in a slot 118 in the periphery of piston 101, permitting a sealing contact with the inner wall of casing 60.

An internally threaded cylindrical bushing 119 is provided, having a diameter so that it may pass slidably within collar 109. This upper end of this bushing provides a stop for all the plunger rods in their retracted position, by the contacting of shoulder 121 of rod 84, for example. Assembly screw 122 secures the upper portion of bushing 119 to a threaded recess (not shown) in the lower face of body 55. Another assembly screw 123 secures base 63 to the lower portion of bushing 119, permitting all components between body 55 and base 63 to be compressively tightened together. Bushing 119 is provided with resilient O-ring 120 which is securely fastened thereto by being positioned in an annular slot in bushing 119. O-ring 120 contacts the inner surface of collar 109 of piston 111 to effectively seal off spring piston chamber below piston 111 from the spring piston chamber above piston 101.

An O-ring 126 and cap seal 127 are disposed in a slot 128 in the periphery of piston 111, permitting a sealing contact with the inner wall of casing 60.

A recess 129 is provided in the lower face of piston 111, located central thereof, to accommodate Belleville washers, such as 131, which are grouped in opposing pairs to give the desired amount of upward bias to spring-loaded piston 111, this forces and maintains longer piston rods, like 89, closed, while no power gas pressure is in the annular chamber 132 (see FIGURE 4) defined by pistons 101 and 111. Power gas can be used in lieu of or in addition to Belleville washers 131 to maintain piston rods 85, 87 and 89 closed while no power gas pressure is in piston chamber 132. Annular recess 133 in the upper face of base 63 provides a boss for washers 131. A resilient O-ring 134 is disposed in a peripheral slot 136 in base 63, permitting an air-tight seal between casing 60 and base 63.

Figure 4:
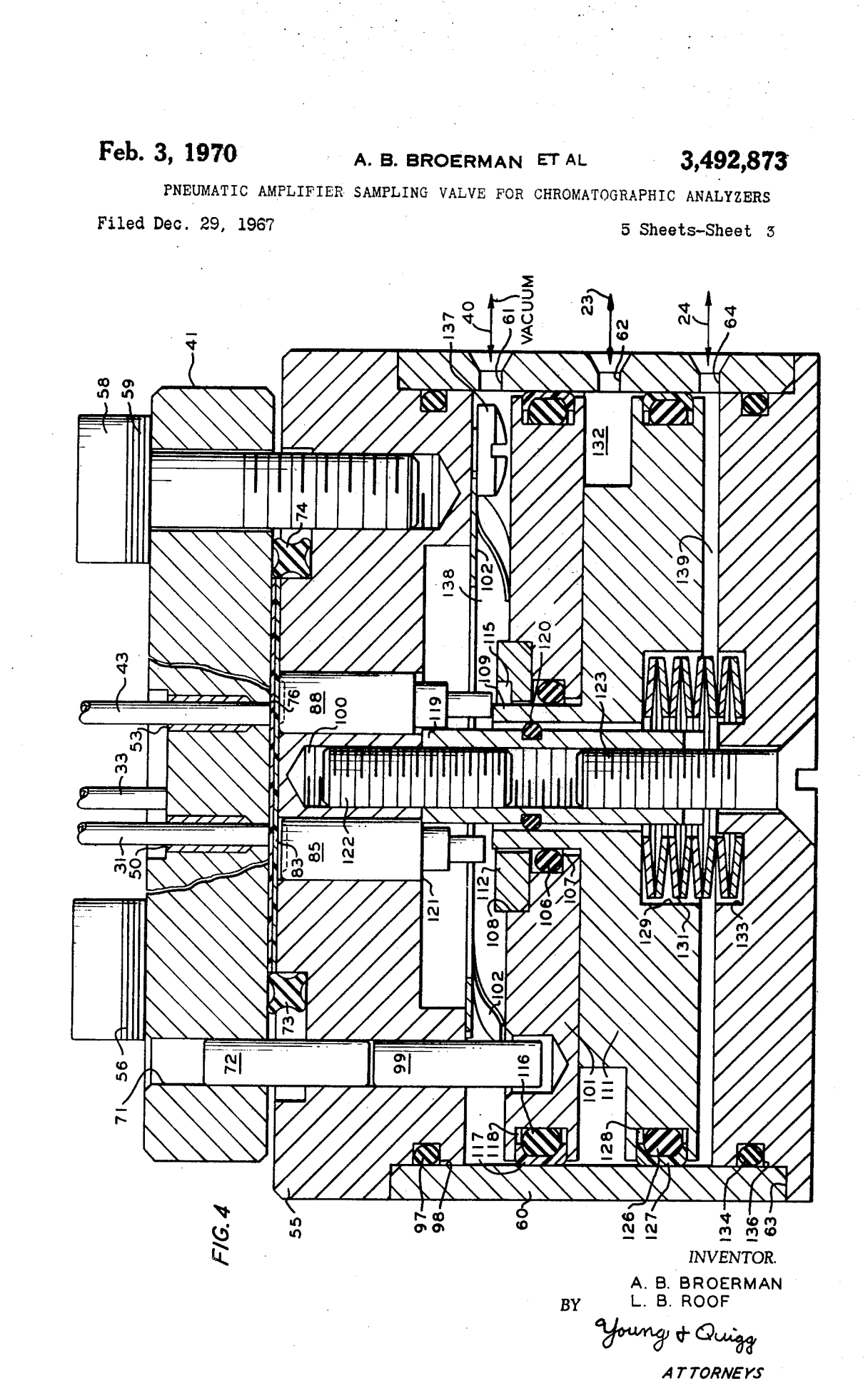

In FIGURE 4, the assembled valve is shown in full section, except for the assembly screws, pins and plunger rods. A screw 137 is seen which retains retracting spring 102 fastened to the lower surface of body 55. Spring 102 is located in a chamber 138 defined by body 55 and air-loaded piston 111. The vacuum line 40, of the preferred embodiment, communicates via passage 61 with chamber 138. Chamber 138, in turn, is in communication with the underside of cushion 83 via the working tolerances surrounding the plunger rods, such as 83.

If it is desirable to have an area defined by a top of a plunger sealed off or blocked, then the plunger rod such as 85, for example, is made longer than usual so that shoulder 121 will rest on the shoulder of 119 when the top of the plunger rod is in sealing engagement with diaphragm 76.

Figure 5:
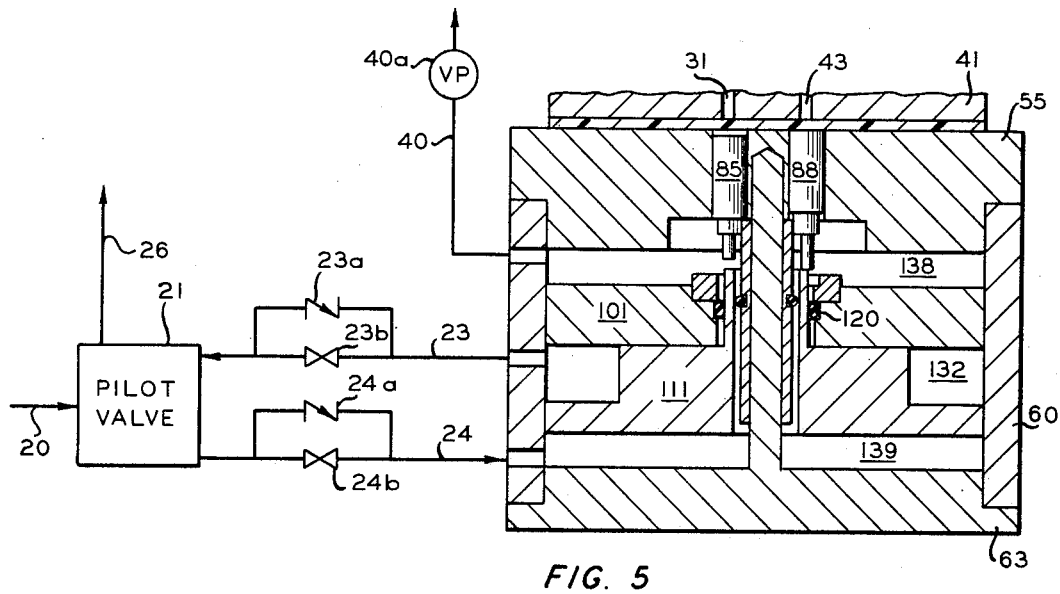
FIGURE 5 is a schematic diagram showing the operation of an embodiment of the invention during a first time interval.
Figure 6:
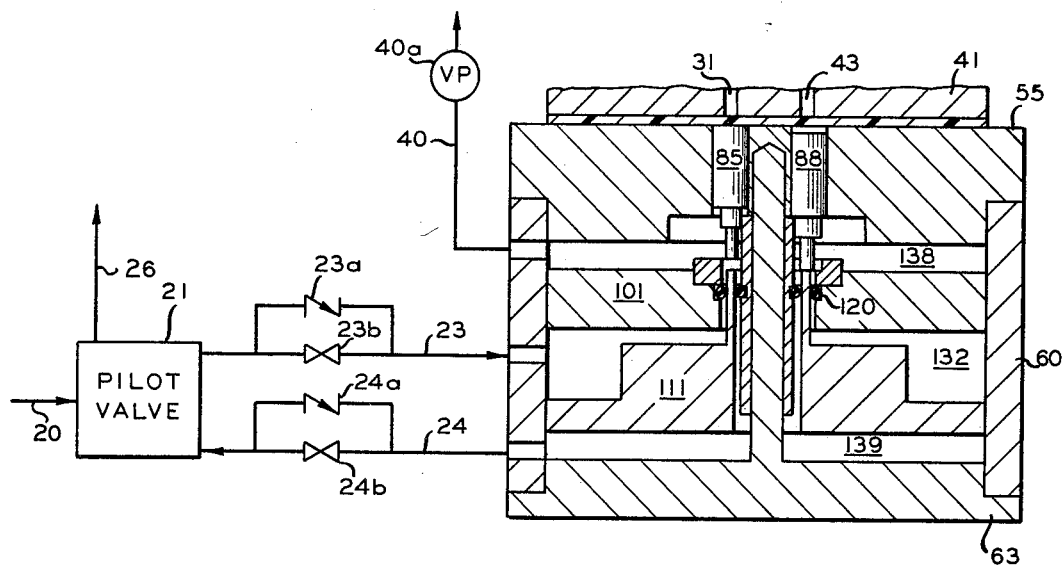
FIGURE 6 is a schematic diagram showing the operation of the valve system shown in FIGURE 5 during a second interval of time.

According to this invention, the conduits communicating with passages 62 and 64 are modified with one-way-restriction means as schematically illustrated in FIGURES 1, 5, and 6. As illustrated, these one-way-restriction means comprise a flow restriction means such as an orifice or adpustable valve means (i.e., 23b and 24b), and a by-pass conduit around the restriction means having a one-way flow valve disposed therein (i.e., 23a and 24a). These one-way flow-restriction means can be the four-way normally closed-normally open-no neutral position adjustable flow valve mechanisms as illustrated on page 11–9 of Catalog V–66 published by Skinner Incorporated, New Britain, Conn. Therefore, one-way-valve elements 23a and 24a allow power fluid to freely pass only into the respective valve chambers, and restrictor elements 23b and 24b prevent the free venting of these chambers after the free flow of power fluid to the chamber is shut off. Restrictor elements 23b and 24b are adjusted so that a pressure loss of only from about 1 to about 10 p.s.i. per second will pass therethrough while the respective chamber is maintained at full signal pressure and power gas is not being supplied thereto via a respective one-way valve element. This will prevent high-pressure fluid from leaking from the ports during valve switching operations wherein signal fluid pressure is cut off from one piston chamber and supplied to the other piston chamber.

In operation of this invention, and referring specifically to FIGURE 5, power gas passes through line 20, valve 21, line 24, one way valve 24a, and into piston chamber 139. At this time, the valve is in the first position and piston chambers 139 and 138 are expanded while chamber 132 is substantially collapsed. In this first position, pressure in chamber 132 has been evacuated through line 23, restrictor 23b, valve 21 and line 26. Pressure is evacuated from chamber 138, which is in communication with the under side of the sealing diaphragm 76 via the small clearance spaces between the plunger rods 84 to 89 and the passages 77 to 82 respectively containing them, the evacuation being made through line 40 and vacuum pump 40a.

At this time, carrier fluid flowing continuously in conduit 27 (see FIGURE 2), under greater than ambient pressure, enters valve 22 via spaced passage 48 (see FIGURE 3), passing downwardly to the lower face of cap 41, and over the top of diaphragm 76 toward either spaced passage 49 or 53, depending upon whether piston rod 84 or 89 is in sealing contact with diaphragm 83. It will be noted in FIGURE 3 from the radial position of the holes in plates 41 and 15 receiving bolt 58 that the bolt is half-way between holes 52 and 53, but opposite hole 81. This places holes 48, 49, 50, 51, 52 and 53 in communication with the top of diaphragm 76 directly above recess 96, 91, 92, 93, 94 and 95 respectively. These recesses are below the diaphragms 76 and 83. Gas cannot pass through diaphragm 76, but it can pass between cap 41 and the diaphragm wherever the diaphragm is not supported against cap 41 by member 74 or one of the rods 84 to 89. Since in the first position only longer rod 84 is in sealing contact, carrier gas flows from pipe 48 which is directly above recess 96 between cap 41 and diaphragm 76 across the top of vertical passage 82, which passage 82 is under the diaphragm, over a recess 95 and into spaced passage 53, and out of valve 22, via conduit 28 to sorption column 29. Concurrently, sampling fluid continuously flowing from sample source conduit 31, under greater than ambient pressure, enters valve 22 through spaced passage 50 (see FIGURE 3). Since longer rod 86 is in sealing contact with the diaphragm, sample fluid flows from pipe 50 above recess 92 across the top of vertical passage 78 over recess 91 and into passage 49, and out of valve 22, via conduit 42, into sample loop 32. Sample fluid re-enters valve 22 from loop 32 via conduit 43 and passage 52. Since longer rod 88 is in sealing contact with the diaphragm, sample flows from above recess 94 across the top of vertical passage 80 over recess 93 and into spaced passage 51, and out of valve 22, via conduit 33 to sample exhaust.

Referring now specifically to FIGURE 6, which shows the valve during a second interval of time, in the second position. Power gas passes through line 20, valve 21, line 23 one way valve 23a to piston chamber 132. Restrictor 24b prevents evacuation from chamber 139 until full actuation pressure is built up in chamber 132. Also, as was the case in FIGURE 5, pressure is evacuated from chamber 138, through line 40 and vacuum pump 40a. The switching from the first interval of time (the first position) to the second interval of time (the second position is determined by programmer 38. When power gas actuation pressure is built up in chamber 132, it overcomes force on power piston 101, first overcoming weak retracting springs 102 and contacting shorter piston rods 85, 87 and 89, raising them to make sealing contact with the adjacent portion of cushion 83 and diaphragm 76, causing the latter to seal the lower face of cap 41, thus shutting off sample in carrier gas flow through valve 22. Also, this pressure within chamber 132 will cause piston 111 to move downward. Pressure is slowly released from chamber 139 via restrictor 24b. This movement of piston 111 allows longer rods 84, 86 and 88 to retract into their vertical passages about .010 inch, by seating on the upper end of bushing 119. The notched recesses, such as 115, must be at least .020 inch deep, .010 inch of which is to allow short rods, such as 85, to rise into sealing position on power gas signal, and the other .010 inch of which is to allow long rod, such as 88, to retract sufficiently open to allow flow across the vertical passage between the recesses adjacent the spaced passages.

This sequence is characterized as a "make seal before break seal" mode of operation, which prevents leakage of fluids from one path of flow to the alternate, as the paths of flow are being alternated.

Carrier fluid from conduit 27 still enters valve 22 via passage 48, passing downwardly to the lower face of cap 41. Since in this second position, shorter rod 89 is in sealing contact with diaphragm, carrier gas flows from above recess 96 across the top of vertical passage 77 over recess 91 and into spaced passage 49, and thence to sample loop, driving the sample slug trapped therein before it. The carrier fluid with sample fluid entrained, re-enters valve 22 from loop 32 via conduit 43 and spaced passage 52. Since shorter rod 87 is in sealing contact with the diaphragm, sample flows from above recess 94 across the top of vertical passage 81 over recess 95 and into spaced passage 53, and out via conduit 28 to sorption column 29 for separation of the constituents in the sample slug in said column.

Simultaneously, sample fluid still enters valve 22 through passage 50. Since shorter rod 85 is in sealing contact with the diaphragm, sample fluid flows from above recess 92 across vertical passage 79 over recess 93 and into spaced passage 51, and out of valve 22, via conduit 33 to sample exhaust.

When pilot valve 21 switches back to the first position, power gas is supplied to the bottom of chamber 139. After full actuation pressure has been built up in chamber 139, the power gas is then exhausted from chamber 132 via line 23, restrictor 23b, valve 21, and line 26 and the power pistons are returned to their initially described position in reverse sequence, and the two sets of piston rods also revert back to the position shown in FIGURES 4 and 5.

SPECIFIC EXAMPLE

Figure 7:
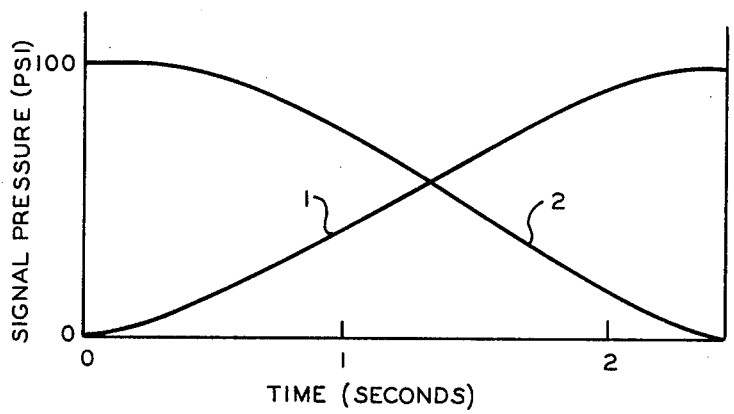
FIGURE 7 is a plot of signal pressure versus time when using the valve mechanism of FIGURES 3 and 3a with a high pressure (3000 p.s.i.) carrier fluid.

Attempts were made to utilize the valving apparatus described above in FIGURES 3–4 to sample a stream of $C_8+$ at ambient conditions. The carrier utilized was normal hexane maintained at 3000 p.s.i. It was found that the high-pressure normal hexane carrier leaked from the ports during the valve switching operations. A plot of signal pressure versus time is illustrated in FIGURE 7. As illustrated about 2½ seconds were required to build full signal pressure within a valve chamber while the pressure within the other chamber decayed appreciably to a point where substantial leakage occurred in less than 1 second.

Figure 8:
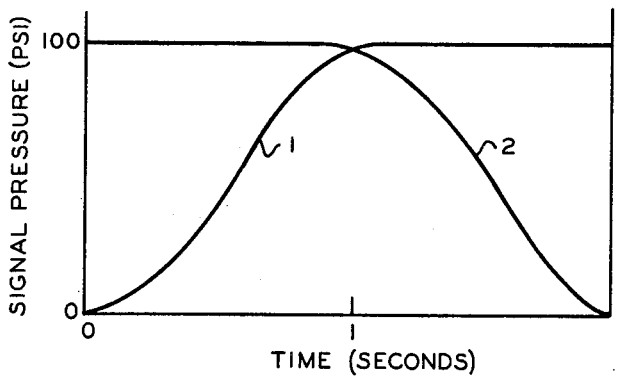
FIGURE 8 is a plot of signal pressure versus time when using the valve mechanism of this invention with a high pressure (3000 p.s.i.) carrier fluid.

Exactly the same tests were carried out with the modified valve apparatus of this invention as illustrated schematically in FIGURES 1, 5 and 6. Restrictors 23b and 24b were set so that no more than about 5 p.s.i. per second leakage of pressure would occur from a pressure chamber from which power gas was cut off until full actuation pressure was built up in the other pressure chamber. FIGURE 8 is a plot of signal pressure versus time showing the improved results with the modified valve apparatus of this invention. As illustrated, substantially full signal pressure was maintained in a pressure chamber from which power gas had been cut off until the power gas pressure in the other chamber was built up to substantially 100 p.s.i. As a result, no leakage occurred from ports containing the high-pressure normal hexane.

By the use of the valve according to the invention, a standard valve can be altered to operate at high or low pressures regardless of the sample or carrier fluid stream pressures.

Reasonable variation and modification are possible within the scope of the foregoing disclosure of the invention without departing from the spirit thereof.

We claim:
1. A fluid-motor actuated valve system for distributing a first fluid to a selected conduit comprising, in combination: a first body having two opposite faces; first, second, and third spaced passages in said body, each of said spaced passages communicating between said faces; a second body having an upper face spaced from the lower face of said first body; a first flexible sealing diaphragm of a diameter at least sufficient to cover said spaced passages; first, second, and third cylindrical recesses in said upper face, opposite said first, second, and third spaced passages, respectively; first and second cylindrical passages traversing said second body, within the circle described by said cylindrical recesses; first and second plunger rods slidably disposed in said first and second cylindrical passages, respectively; the upper ends of said first and second rods adjacent said diaphragm and intermediate the ports of said first, second, and third spaced passages, so that said first rod seals against said diaphragm intermediate said first and second spaced passages, and so that said second rod seals against said diaphragm intermediate said second and third spaced passages; a first power piston disposed adjacent and below said second body and normally biased out of contact with said second rod; a first chamber defined by the lower face of said second body and the upper face of said first power piston; first biasing means disposed in said first chamber normally biasing said first piston downward; a second power piston disposed adjacent and below said first power piston adapted to contact said first plunger rod; a third body disposed adjacent and below said second piston and normally spaced therefrom; a second chamber defined at its upper end by the lower face of said first power piston and at its lower end by the upper face of said second power piston; a third chamber defined at its upper end by the lower face of said second power piston and at its lower end by said third body; said first chamber, said second chamber and said third chamber being pneumatically sealed from each other; a cylindrical casing the inner surface of which makes sealing contact with the peripheries of said power pistons, the upper edge of said casing makes sealing contact with said second body, and the lower edge of said casing makes sealing contact with said third body; means to secure said first, second, and third bodies and said power pistons adjacent to one another in a fixed relationship; a first conduit means connected to supply said first fluid to be distributed under a first pressure to said second spaced passage; a second conduit means connected to receive said first fluid from said first spaced passage; a third conduit means connected to receive said first fluid from said third spaced passage; a fourth conduit means connected to supply, during a first time interval, a second fluid under a second pressure to said second chamber to exert upward pressure on said first power piston, first overcoming said first biasing means and exerting force on said second plunger rod, contacting the upper side of said first power piston to force a first portion of said sealing diaphragm adjacent thereto to seal between the ports of said third and second spaced passages of said first body; said second fluid simultaneously exerting increasing downward pressure of said second power piston, thus retracting said second piston means, permitting said first plunger rod to break sealing contact with a second portion of said sealing diaphragm adjacent thereto, thereby establishing communication between the ports of said first and second spaced passages; whereby first fluid enters said valve system through said second passage and passes out of said system through said first passage; a fifth conduit adapted to supply a third fluid under said second pressure to said third chamber during a second interval of time to bias said second piston upwardly, said fifth conduit adapted to maintain said third chamber substantially at said second pressure until said second chamber is brought to said second pressure, and then to vent said third chamber during said first time interval; said fourth conduit means adapted to maintain said second chamber substantially at said second pressure until said third chamber is brought to said second pressure, and then to vent said second chamber during a second time interval, whereupon said power pistons revert to their first described position, during which said first fluid pressure will establish communication between said third and second spaced passages under said diaphragm, while maintaining sealing communication between said first and second spaced passages, whereby said first fluid enters said system through said second spaced passage and passes out of said system through said third passage, wherein said fourth and fifth conduits each comprise a power gas conduit having a flow restrictor means disposed therein and a by-pass conduit connecting said power gas conduit on either side of said flow restrictor means, said by-pass conduit having a one-way valve means disposed therein adapted to allow fluid flow only to a respective valve chamber.

References Cited

UNITED STATES PATENTS

| | | | |
|---|---|---|---|
| 3,041,869 | 7/1962 | Spraklen et al. | 73—422 XR |
| 3,095,746 | 7/1963 | Reinecke et al. | 73—422 |
| 3,387,496 | 6/1968 | Broerman | 73—422 |
| 3,417,605 | 12/1968 | Hahn | 73—422 XR |

LOUIS R. PRINCE, Primary Examiner

HARRY C. POST III, Assistant Examiner